(12) United States Patent
Kawamura

(10) Patent No.: US 9,399,971 B2
(45) Date of Patent: Jul. 26, 2016

(54) CONTROL DEVICE FOR GASOLINE ENGINE

(75) Inventor: Daigo Kawamura, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 78 days.

(21) Appl. No.: 14/390,417

(22) PCT Filed: Apr. 11, 2012

(86) PCT No.: PCT/JP2012/059861
§ 371 (c)(1),
(2), (4) Date: Oct. 3, 2014

(87) PCT Pub. No.: WO2013/153627
PCT Pub. Date: Oct. 17, 2013

(65) Prior Publication Data
US 2015/0167600 A1    Jun. 18, 2015

(51) Int. Cl.
*F02M 53/00* (2006.01)
*F02M 31/125* (2006.01)
*F02M 53/02* (2006.01)
*F02M 53/06* (2006.01)
*F02D 41/32* (2006.01)
*F02D 41/06* (2006.01)
*F02D 41/08* (2006.01)
*F02M 69/04* (2006.01)
(Continued)

(52) U.S. Cl.
CPC ........... *F02M 31/125* (2013.01); *F02D 31/008* (2013.01); *F02D 41/068* (2013.01); *F02D 41/08* (2013.01); *F02D 41/123* (2013.01); *F02D 41/126* (2013.01); *F02D 41/3005* (2013.01); *F02D 41/3094* (2013.01); *F02D 41/32* (2013.01); *F02M 53/02* (2013.01); *F02M 53/06* (2013.01); *F02M 69/044* (2013.01); *F02M 69/046* (2013.01); *Y02T 10/126* (2013.01)

(58) Field of Classification Search
CPC ............................. F02M 31/125; F02M 53/06
USPC .................................................... 123/549, 557
See application file for complete search history.

(56) References Cited

U.S. PATENT DOCUMENTS

| 5,894,832 A * | 4/1999 | Nogi ......................... F02D 9/10 123/179.15 |
| 2005/0066939 A1 | 3/2005 | Shimada et al. |

(Continued)

FOREIGN PATENT DOCUMENTS

| JP | 2005-54615 | 3/2005 |
| JP | 2009-216005 | 9/2009 |

(Continued)

*Primary Examiner* — Erick Solis
(74) *Attorney, Agent, or Firm* — Finnegan, Henderson, Farabow, Garrett & Dunner, LLP

(57) ABSTRACT

A gasoline engine includes an electric heater, which is embedded in a port-type fuel injection valve and heats the fuel in the fuel injection valve. An electronic control device heats the fuel by means of the electric heater when the engine is cold. When the fuel is not heated by the electric heater, the electronic control device controls the fuel injection valve such that the engine rotational speed NE is a second prescribed value N2 which is higher than the idle rotational speed when the engine is warm. When idle running is performed when the engine is cold and the fuel injected from the fuel injection valve is heated by the electric heater, the amount Q of fuel injected by the fuel injection valve is controlled such that the engine rotational speed NE is less than the second prescribed value N2.

6 Claims, 9 Drawing Sheets

(51) Int. Cl.
*F02D 41/12* (2006.01)
*F02D 41/30* (2006.01)
*F02D 31/00* (2006.01)

(56) References Cited

U.S. PATENT DOCUMENTS

2005/0211229 A1* 9/2005 Pellizzari .............. F02D 41/003
 123/525

2006/0094566 A1* 5/2006 Keeler .................. F02D 41/064
 477/111
2007/0221748 A1* 9/2007 Hornby ................ F02M 31/125
 239/135
2014/0284398 A1* 9/2014 Kabasin ................ F02M 53/06
 239/132

FOREIGN PATENT DOCUMENTS

| | | |
|---|---|---|
| JP | 2010-38000 | 2/2010 |
| JP | 2011-163158 | 8/2011 |
| WO | WO 2012/001310 A1 | 1/2012 |

* cited by examiner

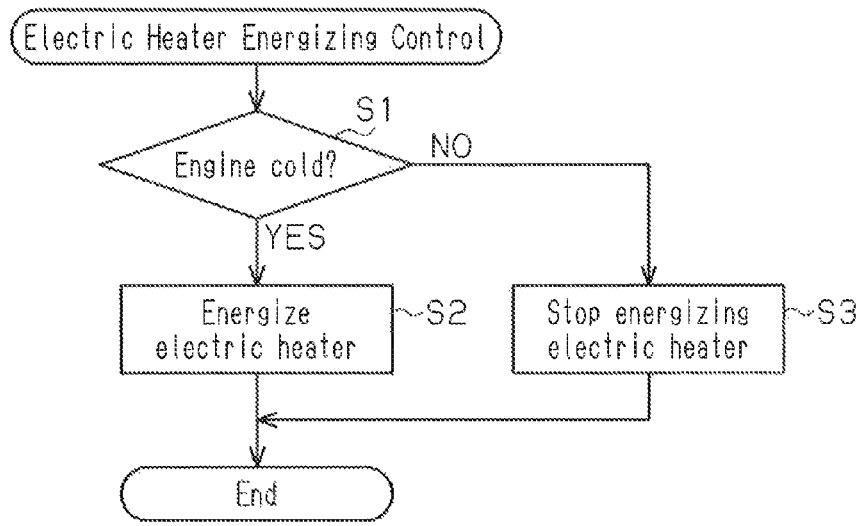
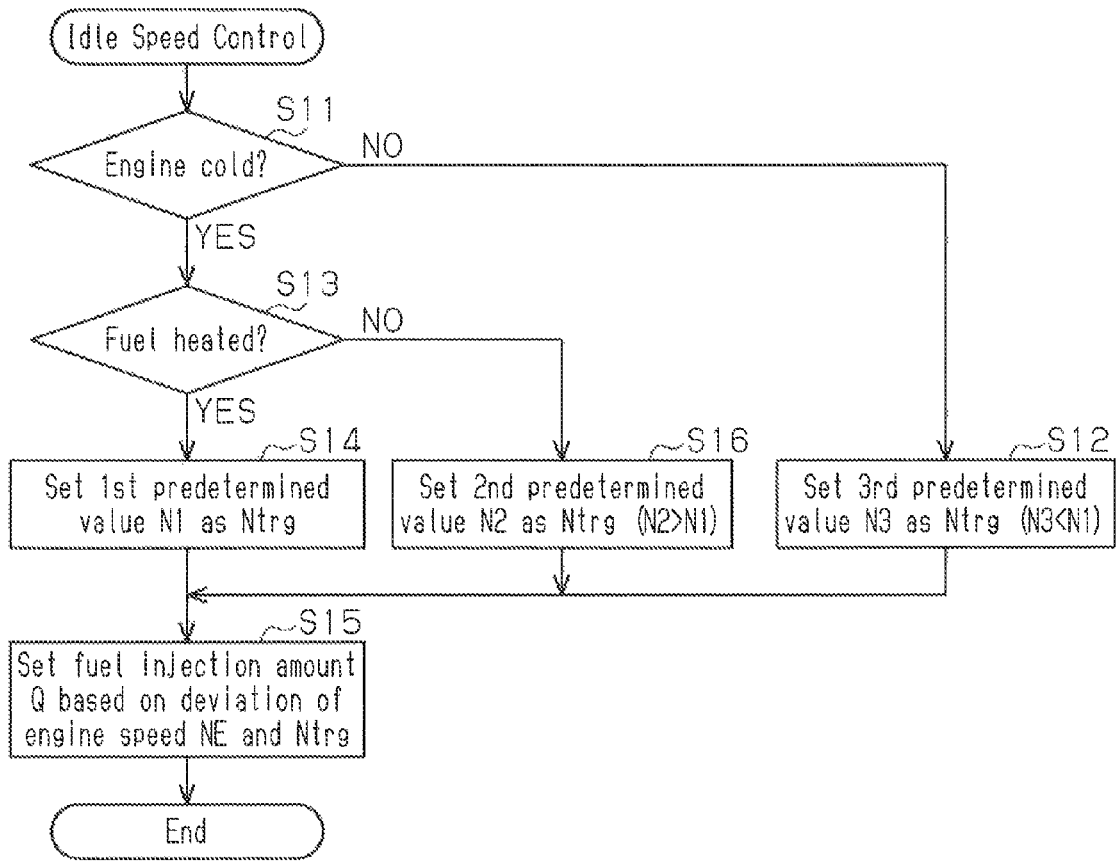

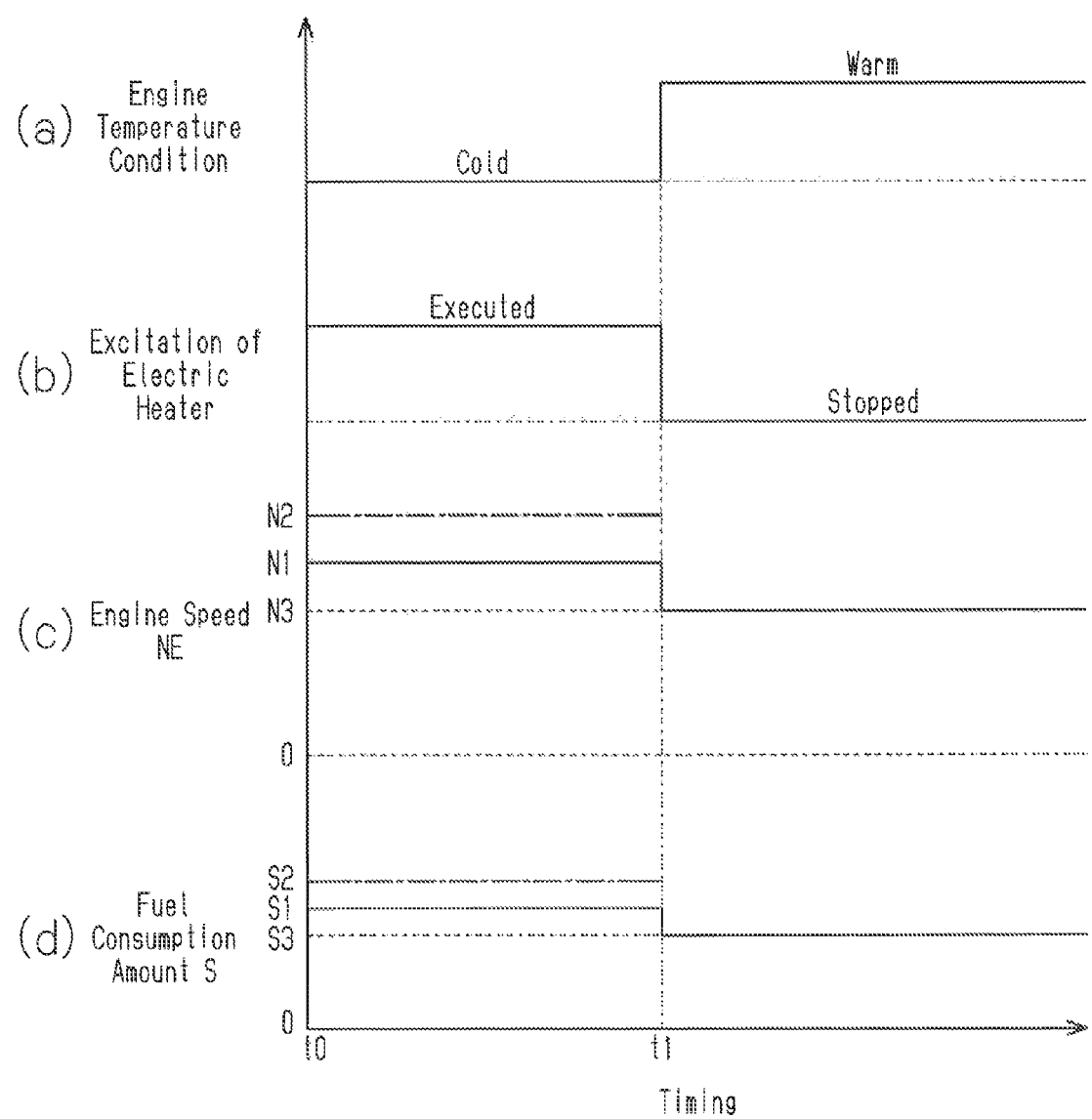

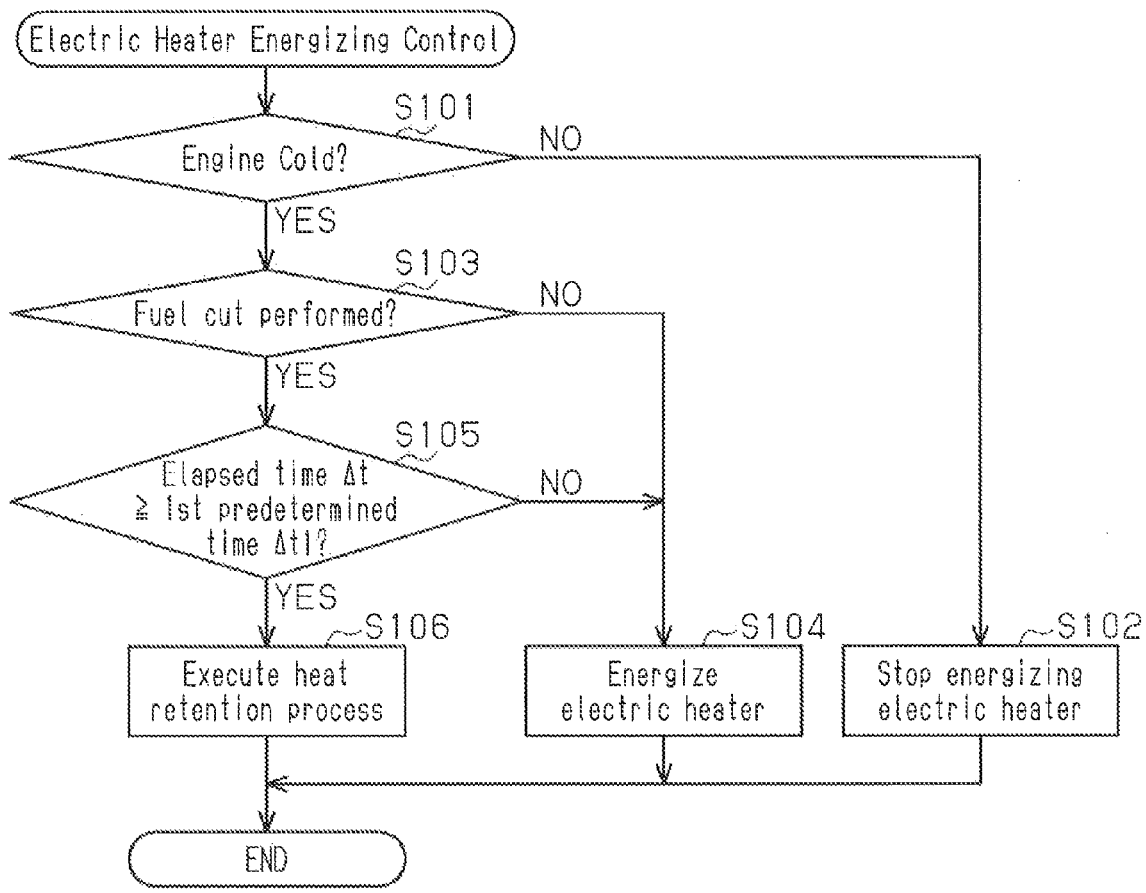

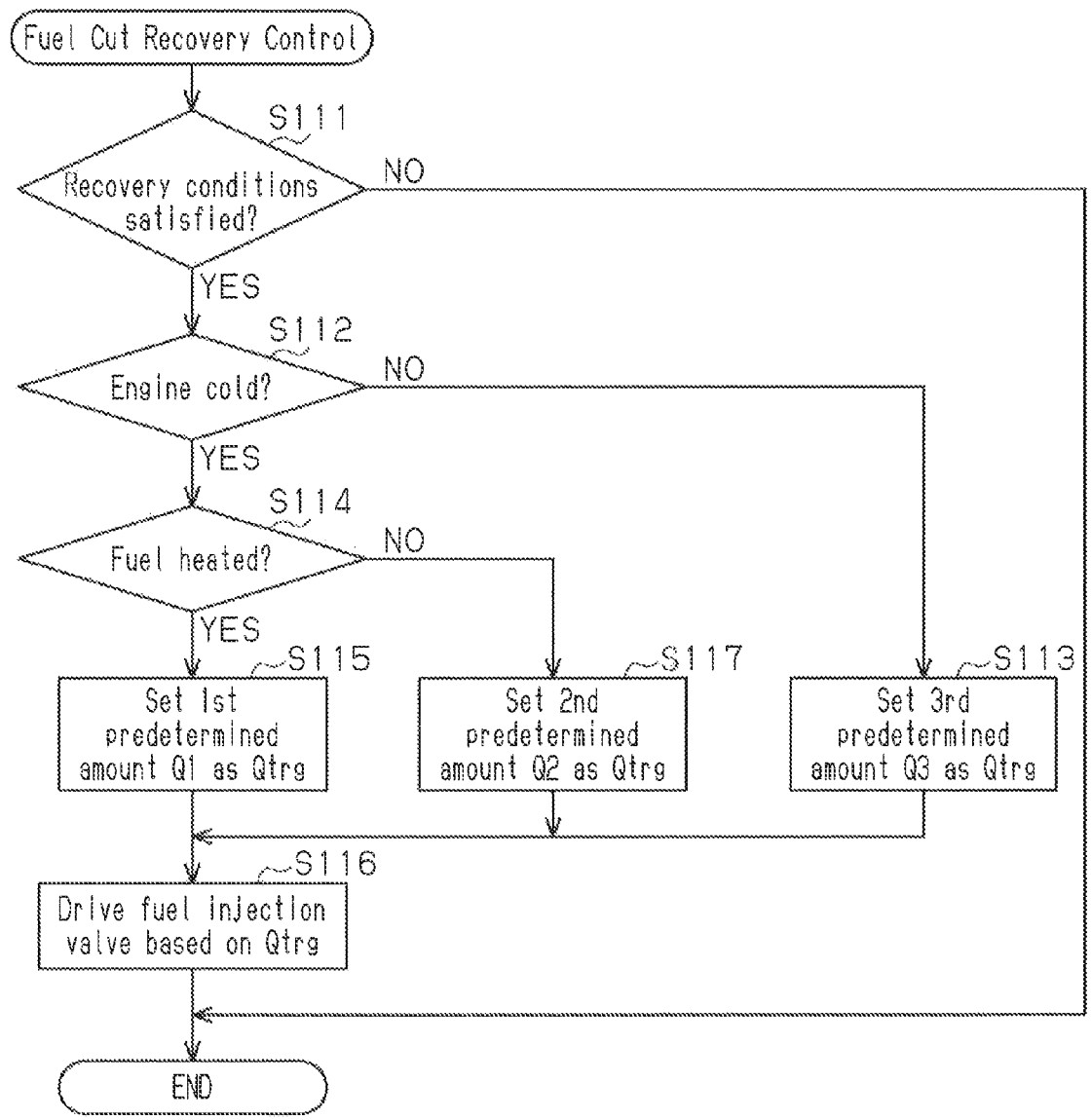

CONTROL DEVICE FOR GASOLINE ENGINE

CROSS-REFERENCE TO RELATED APPLICATIONS

This application is a national phase application of International Application No. PCT/JP2012/059861, filed Apr. 11, 2012, the content of which is incorporated herein by reference.

TECHNICAL FIELD

The present invention relates to a gasoline engine controller.

BACKGROUND ART

In the prior art, a gasoline engine may include a port type fuel injection valve that injects fuel into an intake port, a direct injection type fuel injection valve that directly injects fuel into a cylinder, or both of these fuel injection valves. Further, patent document 1 describes a gasoline engine that includes both of the port type fuel injection valve and the direct injection type fuel injection valve and a controller that controls the gasoline engine.

The exhaust from a gasoline engine includes particulate matter (PM) and atmosphere pollutants such as carbon monoxide and hydrocarbons. The emission of such pollutants has been regulated in the past and is now being further strictly regulated. More specifically, tests are conducted on gasoline engines to capture the PM suspended in the exhaust and measure the mass of the captured PM. The mass of the captured PM needs to be less than or equal to a reference value.

PRIOR ART DOCUMENT

Patent Document

Patent Document 1: Japanese Laid-Open Patent Publication No. 2009-216005

SUMMARY OF THE INVENTION

Problems that are to be Solved by the Invention

Recent studies have found that large particles in the PM suspended in exhausts easily disappear from the human body, whereas small particles tend to remain in the human body. However, as described above, when regulating emissions based on the mass of PM suspended in exhaust gas like in the prior art, by reducing large particles that are suspended in the exhaust gas, the overall PM mass would become less than or equal to the reference value. Thus, the emission of small PM cannot be regulated in a desirable manner.

Accordingly, a method has been proposed to regulate the emission based on the number of PM particles, namely, the PN. More specifically, this requires that the number of PM particles be less than or equal to a threshold number. It is expected that the threshold number will be even smaller in the future. Such a regulation would restrict the number of PM particles suspended in exhausts regardless of the PM particle size.

In controllers for conventional gasoline engines, there is a limit to the number of PM particles suspended in the exhaust that can be reduced while decreasing fuel consumption. Thus, there is a need to use a filter that captures PM such as that arranged in the exhaust passage of a diesel engine, namely, a gasoline particulate filter.

It is an object of the present invention to provide a controller for a gasoline engine that reduces the number of particulate matter particles suspended in exhaust gas in a desirable manner even when a filter that captures particulate matter is not arranged in an exhaust passage.

Means for Solving the Problem

To achieve the above object, a gasoline engine controller according to the present invention controls a gasoline engine including an electric heating device that heats fuel in a portion of a fuel supply line located at an upstream side of an injection hole of a fuel injection valve. Further, the controller heats the fuel with the heating device when the engine is cold.

In the above configuration, the fuel injection valve injects fuel that is heated when the engine is cold. This enhances atomization of the injected fuel. Thus, when the fuel injection valve injects fuel into an intake port, collection of the fuel on a wall in the intake port is limited. When the fuel injection valve directly injects fuel into a cylinder, collection of the fuel on a wall in the intake port is limited. This reduces the amount of residual fuel droplets in the cylinder until combustion starts and increases the pre-mixture degree of fuel and air. Accordingly, even when a filter for capturing particulate matter is not arranged in the exhaust passage, the number of particles of the particulate matter suspended in the exhaust may be reduced in a preferred manner.

In this case, preferably, when the engine is cold and idling, the amount of fuel injected from the fuel injection valve is controlled so that the engine speed when the fuel injected from the fuel injection valve is heated by the heating device is less than the engine speed (non-heated condition idle speed) when the fuel injected from the fuel injection valve is not heated by the heating device.

Some of the fuel injected from the fuel injection valve when the engine is cold collects on a wall in the intake port or on a wall in the cylinder. Thus, when the fuel injection amount is set in the same manner as when the engine is warm, the fuel used for combustion becomes insufficient, and the engine output becomes insufficient. In particular, when the engine is idling, the engine output is low. Thus, when accessories driven by the engine output produce a large load, the engine operation may become instable. In the prior art, to stabilize the engine operation in such a case, when the engine is cold and idling, the fuel injection amount is increased as compared to when the engine is warm. More specifically, the fuel injection amount is controlled so that the engine speed is higher than the idle speed when the engine is warm (non-heated condition idle speed).

The present invention heats the fuel with the heating device to enhance atomization of the fuel. This stabilizes the engine operation without increasing the engine speed to the non-heated condition idle speed. Further, in the above configuration, the fuel consumption amount of the gasoline engine may be reduced compared to a configuration that heats the fuel injected from the fuel injection valve with a heating device and controls the fuel injection amount so that the engine speed becomes equal to the non-heated condition idle speed. Accordingly, when the engine is cold and idling, the engine operation may be stabilized, and the fuel consumption amount may be reduced.

In this case, preferably, the heating device is activated by power supplied from a battery, and the battery is configured to be charged by power generated by an engine-driven power generator. When the engine is cold and idling, the heating performed by the heating device and the amount of fuel injected from the fuel injection valve are controlled so that the fuel consumption amount of the gasoline engine is less when the fuel injected from the fuel injection valve is heated by the heating device as compared to when the fuel is not heated.

Activation of the heating device with the power supplied from the battery to heat the fuel injected from the fuel injection valve lowers the state of charge of the battery. This increases the amount of power generated by the engine-drive power generator. Thus, the engine load increases, and the fuel consumption amount of the gasoline engine may rather increase.

In this regard, in the above configuration, when the engine is cold and idling, the heating performed by the heating device and the amount of fuel injected from the fuel injection valve are controlled so that the fuel consumption amount of the gasoline engine is less when the fuel injected from the fuel injection valve is heated by the heating device than when the fuel is not heated. Accordingly, when the engine is cold and idling, the engine operation may be stabilized, and the fuel consumption amount may be properly reduced.

Preferably, when the engine is cold and the fuel injection valve starts or resumes fuel injection, the amount of fuel injected from the fuel injection valve is controlled so that the fuel injection amount when the fuel injected from the fuel injection valve is heated by the heating device is less than the fuel injection amount (non-heated condition fuel injection amount) when the fuel injected from the fuel injection valve is not heated by the heating device under the condition that other engine operation conditions are the same.

When the engine is cold and the fuel injection valve starts or resumes fuel injection, some of the fuel injected from the fuel injection valve collects on the wall in the intake port and the wall in the cylinder. Thus, when the fuel injection amount is set in the same manner as when the engine is warm, the fuel used for combustion becomes insufficient, and the engine output becomes insufficient. In the prior art, to stabilize the engine operation in such a case, when the engine is cold and the fuel injection valve starts or resumes fuel injection, the fuel injection amount is increased as compared to when the engine is warm. More specifically, the fuel injection amount is increased compared to the fuel injection amount when the engine is warm (non-heated condition fuel injection amount).

In the present invention, when the engine is cold and the fuel injection valve resumes fuel injection, such as when recovering from a fuel cut, the fuel injected from the fuel injection valve is heated by the heating device to enhance atomization of the fuel. This allows for the engine output to be maintained at a sufficient level without increasing the fuel injection amount to the non-heated condition fuel amount. Further, in comparison with a configuration in which the fuel injected from the fuel injection valve is heated by the heating device and the fuel injection amount becomes equal to the non-heated condition fuel injection amount, the fuel consumption amount of the gasoline engine may be reduced. Accordingly, in the above configuration, when the engine is cold and the fuel injection valve starts or resumes fuel injection, the engine output may be maintained at a sufficient level and the fuel consumption amount may be reduced.

In this case, preferably, the heating device is activated by power supplied from a battery, and the battery is configured to be charged by power generated by an engine-driven power generator. When the engine is cold and the fuel injection valve starts or resumes fuel injection, the heating performed by the heating device and the amount of fuel injected from the fuel injection valve are controlled so that the fuel consumption amount of the gasoline engine is less when the fuel injected from the fuel injection valve is heated by the heating device as compared to when the fuel is not heated.

Activation of the heating device with the power supplied from the battery to heat the fuel injected from the fuel injection valve lowers the state of charge of the battery. This increases the amount of power generated by the engine-drive power generator. Thus, the engine load increases, and the fuel consumption amount of the gasoline engine may rather increase.

In this regard, in the above configuration, when the engine is cold and the fuel injection valve starts or resumes fuel injection, the heating performed by the heating device and the amount of fuel injected from the fuel injection valve are controlled so that the fuel consumption amount of the gasoline engine is less when the fuel injected from the fuel injection valve is heated by the heating device as compared to when the fuel is not heated. Accordingly, when the engine is cold and the fuel injection valve starts or resumes fuel injection, the engine output may be maintained at a sufficient level, and the fuel injection amount may be properly reduced.

Preferably, the gasoline engine includes both of a port type fuel injection valve, which injects fuel into an intake port, and a direct injection type fuel injection valve, which directly injects fuel into a cylinder. The heating device is configured to heat the fuel injected from one of the fuel injection valves among the port type fuel injection valve and the direct injection type fuel injection valve. A ratio of the fuel injected from the one of the fuel injection valves is greater when the fuel injected from the one of the fuel injection valves is heated by the heating device than when the fuel is not heated.

A gasoline engine may include both of a port type fuel injection valve, which injects fuel into an intake port, and a direct injection type fuel injection valve, which directly injects fuel into a cylinder. In such a gasoline engine, the heating device may heat the fuel injected from one of these fuel injection valves. In this case, in the above configuration, the ratio of the fuel injected from the one of the fuel injection valves is greater when the fuel injected from the one of the fuel injection valves is heated by the heating device than when the fuel is not heated. Thus, in the fuel injected from both of these fuel injection valves, the fuel heated by the heating device to enhance atomization has a large ratio, and the fuel that is not heated and is difficult to atomize has a small ratio. For example, in a configuration in which the heating device is provided for only the port type fuel injection valve, the amount of fuel injected from the port type fuel injection valve is increased. Nevertheless, atomization of the fuel is enhanced. This decreases the amount of fuel that collects on the wall in the intake port. The fuel injected from the direct injection type fuel injection valve is not heated and is thus difficult to atomize. However, the fuel injection amount is decreased. This decreases the amount of fuel that collects on the wall in the cylinder. Accordingly, the total amount of fuel that collects on the wall in the intake port and the wall in the cylinder may be reduced, and the amount of particles in the particulate matter suspended in exhausts may be properly reduced.

Preferably, a determination is made that the gasoline engine is cold when temperature of the engine is less than or equal to a predetermined temperature.

BRIEF DESCRIPTION OF THE DRAWINGS

FIG. 2 is a flowchart illustrating the procedures for executing energizing control on an electric heater in the first embodiment.

FIG. 3 is a flowchart illustrating the procedures for executing idle speed control in the first embodiment.

FIG. 4 is a timing chart showing the operation of the first embodiment and illustrating transitions in the warming of the engine, the energizing of the electric heater, the engine speed, and the fuel consumption amount.

FIG. 5 is a flowchart illustrating the procedures for executing energizing control on an electric heater in a controller for a gasoline engine according to a second embodiment of the present invention;

FIG. 6 is a flowchart illustrating the procedures for executing fuel cut recovery control in the second embodiment of the present invention.

EMBODIMENTS OF THE INVENTION

A first embodiment of the present invention will now be described with reference to FIGS. 1 to 4. A gasoline engine in the present embodiment is a vehicle-driving, water-cooled multiple cylinder gasoline engine (hereafter, the engine).

Figure 1:
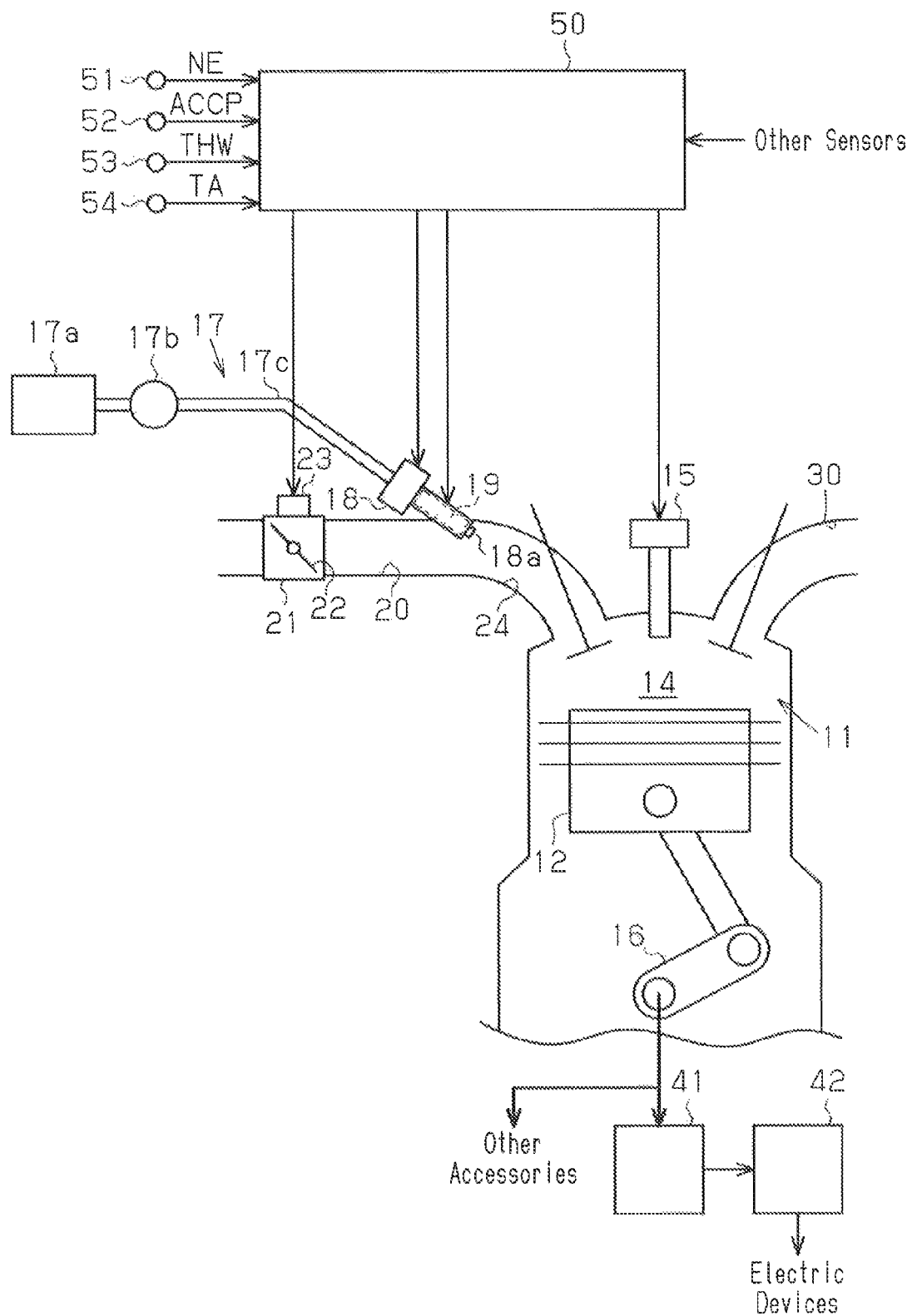
FIG. 1 is a schematic diagram of a controller for a gasoline engine according to a first embodiment of the present invention illustrating the engine and an electronic controller that controls the engine.

FIG. 1 schematically shows the engine of the present embodiment and an electronic controller 50 that controls the engine. FIG. 1 shows the cross-sectional structure of a single cylinder 11.

As shown in FIG. 1, a piston 12 reciprocates in the cylinder 11. The piston 12 is coupled to a crankshaft 16. The reciprocation of the piston 12 rotates and drives the crankshaft 16. The inner wall of the cylinder 11 and the top surface of the piston 12 define a combustion chamber 14. A spark plug 15 is exposed in the combustion chamber 14.

The cylinder 11 is connected to an intake passage 20 and an exhaust passage 30. The intake passage 20 includes a throttle body 21, which accommodates a throttle valve 22. A throttle motor 23 drives and opens and closes the throttle valve 22. The intake passage 20 is connected via an intake port 24 to the cylinder 11.

The engine includes a fuel supply line 17 that supplies fuel. The fuel supply line 17 includes a fuel tank 17a, which stores fuel, a fuel pump 17b, which draws fuel from the fuel tank and discharges the fuel, a supply passage 17c, which delivers the discharged fuel, and a fuel injection valve 18, which injects the delivered fuel from an injection hole 18a into the intake port 24. The fuel injection valve 18 incorporates an electric heater 19 to heat the fuel inside the fuel injection valve 18, that is, the fuel in a portion located at the upstream side of the injection hole 18a in the fuel supply line 17 including the fuel injection valve 18. The electric heater 19 is activated by the power supplied from a battery 42.

Various types of accessories and electric devices are driven by the engine. The engine-driven accessories include, for example, an alternator 41 that generates power when driven by the rotation of the crankshaft 16. The power generated by the alternator 41 charges the battery 42.

The electronic controller 50, which serves as a control unit, executes various types of control on the engine. The electronic controller 50 includes a central processing unit (CPU) that performs computations related to various types of control, a read only memory (ROM) that stores various types of control programs and data, and a random access memory (RAM) that temporarily stores computation results or the like. The electronic controller 50 reads detections signals of various sensors, performs various types of computations, and entirely controls the engine based on the computation results.

The various sensors include an engine speed sensor 51, which detects the engine speed NE, an accelerator depression amount sensor 52, which detects the accelerator depression amount ACCP that is the depression amount of the accelerator pedal, a coolant temperature sensor 53, which detects the coolant temperature THW that is the temperature of the engine coolant, and a throttle sensor 54, which detects the throttle open degree TA that is the open degree of the throttle valve 22.

The electronic controller 50 performs various computations based on signals output from the various sensors and executes various types of controls on the engine based on the computations results.

More specifically, the electronic controller 50 executes throttle control for controlling the open degree of the throttle valve 22, fuel injection control for controlling the fuel injection amount and fuel injection timing of the fuel injection valve 18, ignition timing control for controlling the ignition timing of the spark plug 15, and the like. Further, the electronic controller 50 executes idle speed control for maintaining the engine speed NE when the engine is idling at a target rotation speed Ntrg.

The electronic controller 50 executes energizing control on the electric heater 19.

FIG. 2 shows the procedures for executing the energizing control on the electric heater 19 in the present embodiment. The series of processes is repetitively performed in predetermined intervals by the electronic controller 50.

As shown in FIG. 2, in the series of processes, the electronic controller 50 first determines whether or not the engine is cold (step S1). Here, the electronic controller 50 determines that the engine is cold when, for example, the coolant temperature THW is less than or equal to a predetermined temperature (e.g., 70° C.). When determining that the engine is cold, the electronic controller 50 proceeds to step S2, energizes the electric heater 19, and temporarily terminates the series of processes. When determining that the engine is not cold, that is, when determining that the engine is warm (step S1: "NO"), the electronic controller 50 proceeds to step S3, stops energizing the electric heater 19 (when the energizing has already been stopped, continues to stop the energizing), and temporarily terminates the series of processes.

The electronic controller 50 executes idle speed control as described below.

When the engine is cold, some of the fuel injected from the fuel injection valve 18 collects on the wall in the intake port 24. Thus, when the fuel injection amount is set in the same manner as when the engine is warm, the fuel that is burned is insufficient, and the engine output becomes insufficient. In particular, when the engine is idling, the engine output is low. Thus, when the load of the accessories driven by the engine output is large, the engine operation may become instable.

Accordingly, in the present embodiment, to stabilize the engine operation, when the engine is cold and idling, the fuel injection amount is increased compared to when the engine is warm.

More specifically, when the electric heater 19 does not heat the fuel, the electronic controller 50 is configured to control fuel injection from the fuel injection valve 18 to set the engine speed NE at a higher speed (second predetermined value N2) than the idle speed (third predetermined value N3) when the engine is warm. The second predetermined value N2 corresponds to a non-heated condition idle speed.

When the electric heater 19 heats the fuel injected from the fuel injection valve 18, the electronic controller 50 is configured to control the fuel injection amount of the fuel injection valve 18 so that the engine speed NE becomes equal to a first predetermined value N1, which is less than the second predetermined value N2.

The electric heater 19, when powered by the battery 42, lowers the state of charge of the battery 42. This increases the amount of power generated by the alternator 41. Thus, the engine load increases. This may increase the fuel consumption amount of the gasoline engine.

Accordingly, in the present embodiment, the electronic controller 50 is configured to control the heating performed by the electric heater 19 and the fuel injection amount of the fuel injection valve 18 so that less fuel is consumed by the engine when the electric heater 19 heats the fuel injected from the fuel injection valve 18 as compared to when the electric heater 19 does not heat the fuel.

FIG. 3 shows the procedures for executing the idle speed control in the present embodiment. The series of processes is repetitively performed in predetermined intervals by the electronic controller 50.

As shown in FIG. 3, in the series of processes, the electronic controller 50 first determines whether or not the engine is cold (step S11). When the engine is not cold and warm (step S11: "NO"), the electronic controller 50 proceeds to step S12 to set the third predetermined value N3 as the target speed Ntrg and then proceeds to step S15.

When the engine is cold in step S11 (step S11: "YES"), the electronic controller 50 proceeds to step S13 and determines whether or not the fuel in the fuel injection valve 18 is heated. More specifically, when the electric heater 19 is energized, the electronic controller 50 determines that the fuel is heated in the fuel injection valve 18.

As a result, when determining that the fuel is heated (step S13: "YES"), the electronic controller 50 sets the first predetermined value N1, which is greater than the third predetermined value N3 (N1>N3), as the target speed Ntrg, and then proceeds to step S15.

When the electric heater 19 is not energized due to, for example, the state of charge being low in the battery 42, the electronic controller 50 determines in step S13 that the fuel is not heated (step S13: "NO") and then sets the second predetermined value N2, which is greater than the first predetermined value N1 (N2>N1), as the target speed Ntrg. Then, the electronic controller 50 proceeds to step S15.

In step S15, based on the deviation of the actual engine speed NE and the target speed Ntrg, which is set as described above, the electronic controller 50 sets the fuel injection amount Q so that the engine speed NE becomes equal to the target speed Ntrg. Then, the electronic controller 50 temporarily terminates the series of processes.

The operation of the present embodiment will now be described.

When the engine is cold, heated fuel is injected from the fuel injection valve 18. This enhances atomization of the fuel and reduces the fuel that collects on the wall in the intake port 24. Thus, the amount of fuel droplets in the cylinder 11 remaining in the cylinder 11 until combustion starts may be reduced, and the pre-mixture degree of fuel and air may be increased. Accordingly, the number of PM particles suspended in the exhaust, namely, the PN, may be decreased in a preferred manner.

With reference to FIG. 4, one example of the transition of parameters when the idle speed control of the present embodiment is performed will now be described. In FIG. 4, section (a) shows the transition of the warming of the engine, section (b) shows the transition of the energizing of the electric heater 19, section (c) shows the transition of the engine speed NE, and section (d) shows the transition of the fuel consumption amount S of the engine. In the drawing, the solid line shows the transition of each parameter when the fuel injected from the fuel injection valve 18 is heated by the electric heater 19, and the single-dashed line shows the transition of each parameter when the fuel is not heated.

As shown in sections (a) and (b), when the engine is cold and idling (timing t0 to t1), the electric heater 19 is energized to heat the fuel injected from the fuel injection valve 18. In this case, as shown by the solid line in section (c), the engine speed NE is equal to the first predetermined value N1. Further, as shown by section (d), the fuel consumption amount S1 is less than the fuel consumption amount S2 when the electric heater 19 does not heat the fuel injected from the fuel injection valve 18.

Then, at timing t2, when warming is completed and the engine becomes warm, the energizing of the heater 19 is stopped. Further, the engine speed NE becomes equal to the third predetermined value N3.

In this manner, when the engine is cold and idling, the electric heater 19 heats the fuel and enhances atomization of the fuel. This stabilizes the engine operation without increasing the engine speed NE to the second predetermined value N2 (non-heated condition idle speed). Further, the fuel consumption amount S may be decreased compared to a configuration that heats the fuel injected from the fuel injection valve 18 with the electric heater 19 and controls the amount of fuel injected from the fuel injection valve 18 so that the engine speed NE becomes equal to the second predetermined value N2.

Further, in the present embodiment, when heating the fuel with the electric heater 19, by controlling the heating performed by the electric heater 19 and the fuel injection amount Q of the fuel injection valve 18, the fuel consumption amount S of the engine is decreased compared to when the fuel is not heated.

The controller for the gasoline engine of the embodiment described above has the advantages described below.

(1) The electronic controller 50 controls the gasoline engine including the electric heater 19 that is incorporated in the fuel injection valve 18 to heat fuel inside the fuel injection valve 18. Further, the electric heater 19 heats the fuel when the engine is cold. This configuration reduces the number of PM particles suspended in the exhaust, namely, the PN, in a preferred manner even when the exhaust passage 30 does not include a filter that captures PM.

(2) If the fuel injected from the fuel injection valve 18 is heated with the electric heater 19 when the engine is cold and idling, the fuel injection amount Q of the fuel injection valve 18 is controlled so that the engine speed NE becomes less than the second predetermined value N2. In such a configuration, when the engine is cold and idling, the fuel consumption amount S may be reduced while stabilizing the engine operation.

(3) The electric heater 19 is powered by the battery 42. The battery 42 is configured to be charged by the power generated by the alternator 41. If the engine is cold and idling, the heating performed by the electric heater 19 and the fuel injection amount of the fuel injection valve 18 are controlled so that less fuel is consumed by the gasoline engine when the electric heater 19 heats the fuel injected from the fuel injection valve 18 as compared to when the electric heat does not heat the fuel. When the engine is cold and idling, such a configuration properly decreases the fuel consumption amount S while stabilizing the engine operation.

A second embodiment of the present invention will now be described with reference to FIGS. 5 to 8. The gasoline engine and the controller of the gasoline engine in the present embodiment have the same configuration as the first embodiment (refer to FIG. 1).

In the present embodiment, if predetermined fuel cut execution conditions are satisfied when the engine is running, the electronic controller 50 performs the so-called fuel cut and stops injecting fuel from the fuel injection valve 18. If predetermined recovery conditions are satisfied when fuel cut is being performed, fuel cut recovery control is performed to resume fuel injection from the fuel injection valve 18. The predetermined fuel cut conditions are satisfied when, for example, the accelerator depression amount ACCP is minimal (depression amount zero) while the engine speed NE is greater than or equal to a predetermined speed. The predetermined recovery conditions are satisfied if, for example, the accelerator depression amount ACCP increases when fuel cut is being performed or when the engine speed NE becomes less than or equal to a recovery speed, which is lower than the predetermined speed.

FIG. 5 shows the procedures for executing the energizing control on the electric heater 19 in the present embodiment. The series of processes is repetitively performed in predetermined intervals by the electronic controller 50.

As shown in FIG. 5, in the series of processes, the electronic controller 50 first determines whether or not the engine is cold (step S101). Here, when determining that the engine is not cold, that is, when determining that the engine is warm (step S101: "NO"), the electronic controller 50 proceeds to step S102, stops energizing the electric heater 19 (when the energizing has already been stopped, continues to stop the energizing), and temporarily terminates the series of processes.

When determining that the engine is cold (step S101: "YES"), the electronic controller 50 proceeds to step S103 and determines whether or not fuel cut is being performed. If fuel cut is not being performed (step S103: "NO"), the electronic controller 50 proceeds to step S104, energizes the electric heater 19, and temporarily terminates the series of processes.

When determining that fuel cut is being performed in step S103 (step S103: "YES"), the electronic controller 50 proceeds to step S105 and determines whether the elapsed time Δt from when the fuel cut started is longer than or equal to a first predetermined time Δt1 (five seconds in the present embodiment). When the elapsed time Δt from when the fuel cut started is shorter than the first predetermined time Δt1 (step S105: "NO"), the electronic controller 50 proceeds to step S104, energizes the electric heater 19, and temporarily terminates the series of processes.

When the elapsed time Δt is longer than or equal to the first predetermined time Δt1 (step S105: "YES"), the electronic controller 50 performs a heat retention process and temporarily terminates the series of processes. In the heat retention process, the electronic controller 50 repetitively performs processes for first stopping energizing of the electric heater 19 over a second period time Δt2 (ten seconds in the present embodiment) and then energizing the electric heater 19 over a third predetermined time Δt3 (one second in the present embodiment).

Further, the electronic controller 50 executes the fuel cut recovery control as described below.

If fuel injection from the fuel injection valve 18 is resumed when the engine is cold, some of the fuel injected from the fuel injection valve 18 collects on the wall in the intake port 24. Thus, when the fuel injection amount is set in the same manner as when the engine is warm, the fuel that is burned is insufficient, and the engine output becomes insufficient. Accordingly, in the present embodiment, to compensate for the insufficient engine output, if fuel injection from the fuel injection valve 18 is resumed when the engine is cold, the fuel injection amount is increased compared to when the engine is warm.

More specifically, when the electric heater 19 does not heat the fuel, compared under the condition that other engine operation conditions are the same, the fuel injection amount is controlled so that the fuel injection amount becomes equal to a second predetermined amount Q2, which is greater than the fuel injection amount when the engine is warm (third predetermined amount Q3). The second predetermined amount Q2 corresponds to a non-heated condition fuel injection amount.

Further, when the electric heater 19 heats the fuel injected from the fuel injection valve 18, compared under the condition that other engine operation conditions are the same, the fuel injection amount is controlled so that the fuel injection amount becomes equal to a first predetermined amount Q1, which is less than the second predetermined amount Q2.

As described above, the electric heater 19, when activated by the power from the battery 42, lowers the state of charge of the battery 42. This increases the amount of power generated by the alternator 41. Thus, the engine load increases. This may increase the fuel consumption amount S of the gasoline engine.

Accordingly, in the present embodiment, the heating performed by the electric heater 19 and the fuel injection amount of the fuel injection valve 18 are controlled so that the fuel consumption amount S of the engine is less when the electric heater 19 heats the fuel injected from the fuel injection valve 18 than when the electric heater 19 does not heat the fuel.

FIG. 6 shows the procedures for executing the fuel cut recovery control in the present embodiment. When fuel cut is being performed, the series of processes is repetitively performed in predetermined intervals by the electronic controller 50.

As shown in FIG. 6, in the series of processes, the electronic controller 50 first determines whether or not predetermined recovery conditions are satisfied (step S111). When the predetermined recovery conditions are not satisfied (step S111: "NO"), the electronic controller 50 temporarily terminates the series of processes to continue performing the fuel cut.

When the predetermined recovery conditions are satisfied (step S111: "YES"), the electronic controller 50 proceeds to step S112 and determines whether or not the engine is cold. When the engine is not cold (step S112: "NO"), the electronic controller 50 sets the third predetermined amount Q3 as the target fuel injection amount Qtrg and then proceeds to step S116.

When the engine is cold (step S112: "YES"), the electronic controller 50 proceeds to step S114 and determines whether or not the fuel is heated in the fuel injection valve 18.

When determining that the fuel is heated (step S114: "YES"), the electronic controller 50 proceeds to step S115 and sets the first predetermined amount Q1 as the target fuel injection amount Qtrg. Then, the electronic controller 50 proceeds to step S116.

When the electric heater 19 is not energized due to, for example, a low state of charge of the battery 42, the electronic controller 50 determines in step S114 that the fuel is not heated (step S114: "NO") and proceeds to step S117 to set the second predetermined amount Q2, which is greater than the first predetermined amount Q1, as the target fuel injection amount Qtrg. Then, the electronic controller 50 proceeds to step S116.

In step S116, the electronic controller 50 drives the fuel injection valve 18 based on the target fuel injection amount Qtrg set as described above and then temporarily terminates the series of processes.

Figure 7:
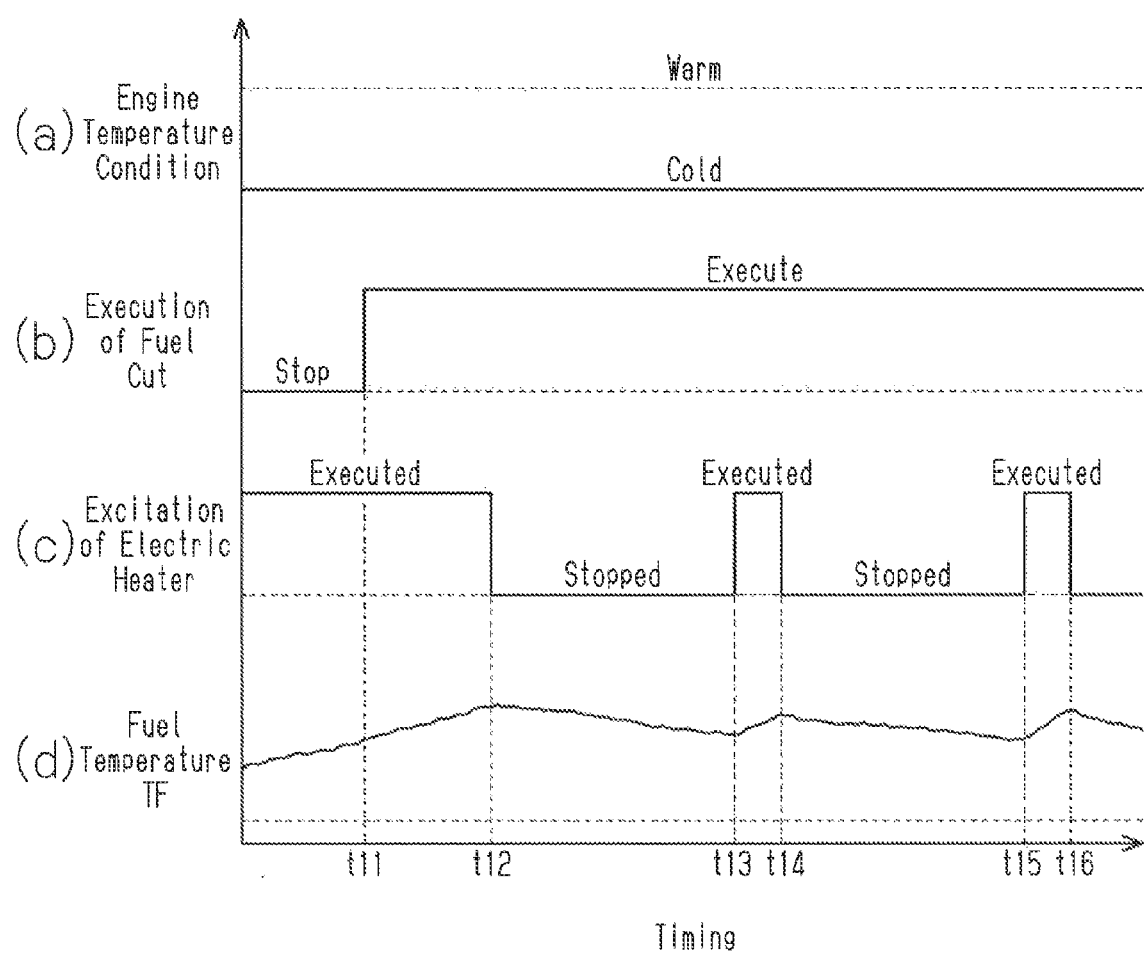
FIG. 7 is a timing chart showing the operation of the second embodiment and illustrating transitions in the warming of the engine, the execution of fuel cut, the energizing of the electric heater, and the temperature of the fuel in the fuel injection valve.

With reference to FIG. 7, one example of the transition of parameters when the energizing control is executed on the electric heater 19 in the present embodiment will now be described. In FIG. 7, section (a) shows the transition of the warming of the engine, section (b) shows the transition of fuel cut execution, section (c) shows the transition of the energizing of the electric heater 19, and section (d) shows the transition of the temperature TF of the fuel in the fuel injection valve 18.

As shown in sections (a) and (b), when the engine is cold and the electric heater 19 is energized, the predetermined fuel cut execution conditions are satisfied at timing t11. Thus, fuel cut is executed. Then, as shown in section (c), the energizing of the electric heater 19 is continued until timing t12, which is when the elapsed time Δt from timing t11 becomes equal to the first predetermined time Δt1. As shown in section (d), this gradually increases the temperature TF of the fuel in the fuel injection valve 18.

At timing t12, the energizing of the electric heater 19 is stopped. The energizing continues to be stopped until timing t13, that is, until the elapsed time Δt from timing t12 becomes equal to the second predetermined time Δt2. At timing t13, the electric heater 19 is energized over the third predetermined time Δt3 until timing t14. Subsequently, as long as the fuel cut continues, the process from timing t12 to timing t14, that is, the process of step S106 in FIG. 5 (heat retention process) is repetitively performed. By performing the heat retention process, the temperature TF of the fuel in the fuel injection valve 18 is maintained within a predetermined range when fuel cut is executed.

Figure 8:
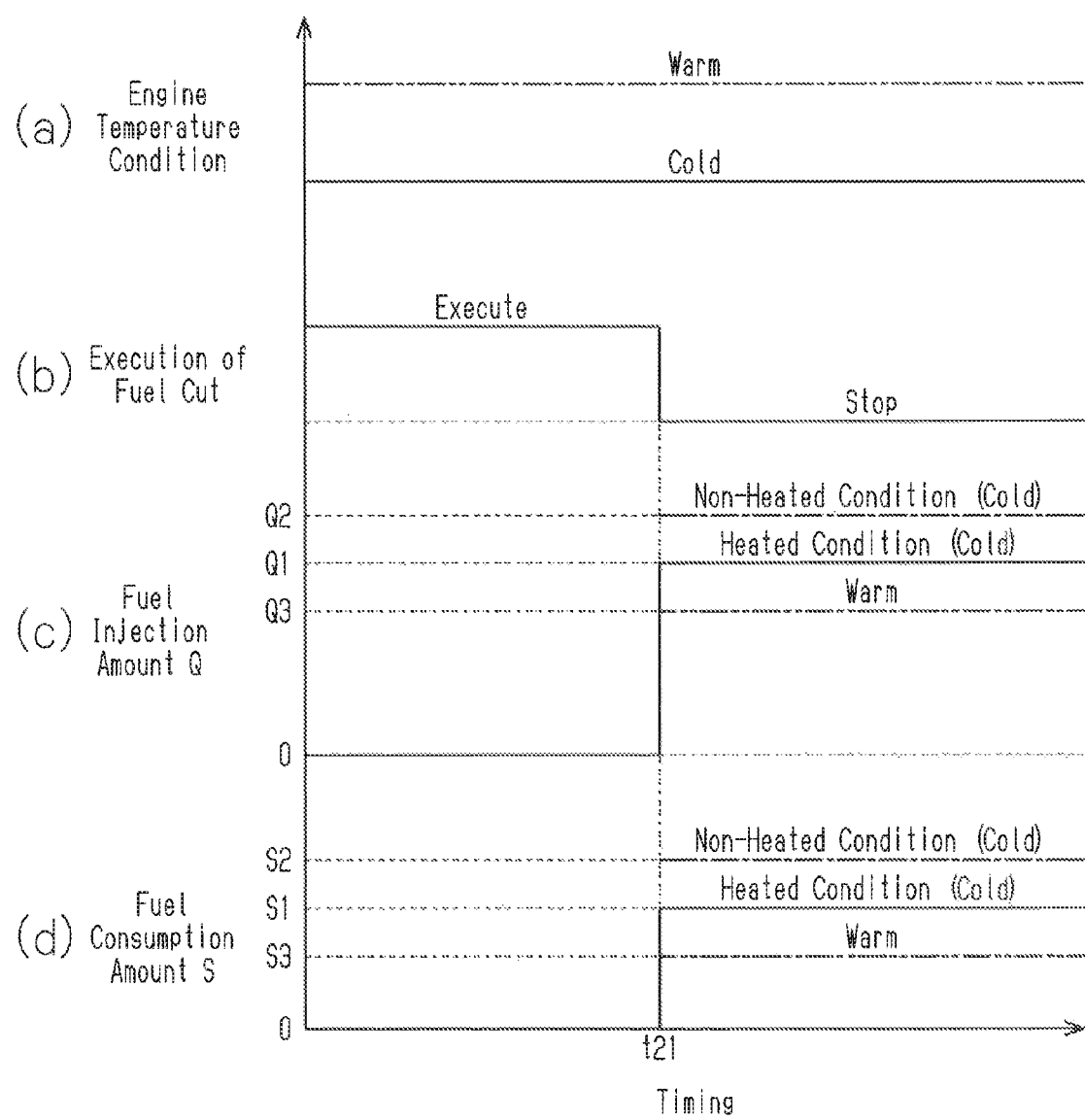
FIG. 8 is a timing chart showing the operation of the second embodiment and illustrating transitions in the warming of the engine, the execution of fuel cut, the fuel injection amount, and the fuel consumption amount.

With reference to FIG. 8, one example of the transition of parameters when the fuel cut recovery control is executed in the present embodiment will now be described. In FIG. 8, section (a) shows the transition of the warming of the engine, section (b) shows the transition of fuel cut execution, section (c) shows the transition of the fuel injection amount Q, and section (d) shows the transition of the fuel injection amount S. In the drawing, the solid lines show the transition of each parameter when the electric heater 19 heats the fuel injected from the fuel injection valve 18, and the single-dashed lines show the transition of each parameter when fuel is not heated. Further, the double-dashed lines show the transition of each parameter when the engine is cold.

As shown in sections (a) and (b), when the engine is cold, the predetermined recovery conditions are satisfied at timing t21. Thus, fuel cut is stopped to recover and resume fuel injection from the fuel injection valve 18. Here, as shown by the solid line in section (c), the fuel injection amount Q is the first predetermined amount Q1. Further, as shown in section (d), the fuel consumption amount S1 is less than the fuel consumption amount S2 when the electric heater 19 does not heat the fuel injected from the fuel injection valve 18.

In this manner, when the engine is cold and fuel injection from the fuel injection valve 18 is resumed to recover from the fuel cut, the electric heater 19 heats the fuel to enhance atomization of the fuel. Thus, the insufficient engine output may be compensated for without increasing the fuel injection amount Q to the second predetermined amount Q2 (non-heated condition fuel consumption amount). Further, the fuel consumption amount S of the engine may be reduced compared to a configuration that heats the fuel injected from the fuel injection valve 18 with the electric heater 19 and controls the fuel injection amount Q to be equal to the second predetermined amount Q2.

Further, in the present embodiment, when heating fuel with the electric heater 19, by controlling the heating performed with the electric heater 19 and the fuel injection amount Q of the fuel injection valve 18, the fuel consumption amount S of the engine is reduced compared to when fuel is not heated.

In addition to advantages (1) to (3) of the first embodiment, the controller of the gasoline engine in the present embodiment described above has following advantages (4) and (5).

(4) When the engine is cold and fuel injection from the fuel injection valve 18 is resumed, if the electric heater 19 heats the fuel injected from the fuel injection valve 18, in a comparison under the condition that other engine operation conditions are the same, the fuel injection amount is controlled so that the amount of fuel injected from the fuel injection valve 18 is less than the second predetermined amount Q2. In such a configuration, when the engine is cold and fuel injection from the fuel injection valve 18 is resumed, the fuel consumption amount S may be decreased while compensating for the insufficient engine output.

(5) When the engine is cold and fuel injection from the fuel injection valve 18 is resumed, the heating performed by the electric heater 19 and the fuel injection amount Q of the fuel injection valve 18 are controlled so that the fuel consumption amount S of the gasoline engine decreases when the fuel injected from the fuel injection valve 18 is heated by the electric heater 19 compared to when the fuel is not heated. In such a configuration, when the engine is cold and fuel injection is resumed, the fuel consumption amount may be properly decreased while compensating for the insufficient engine output.

A third embodiment of the present invention will now be described with reference to FIGS. 9 and 10.

Figure 9:
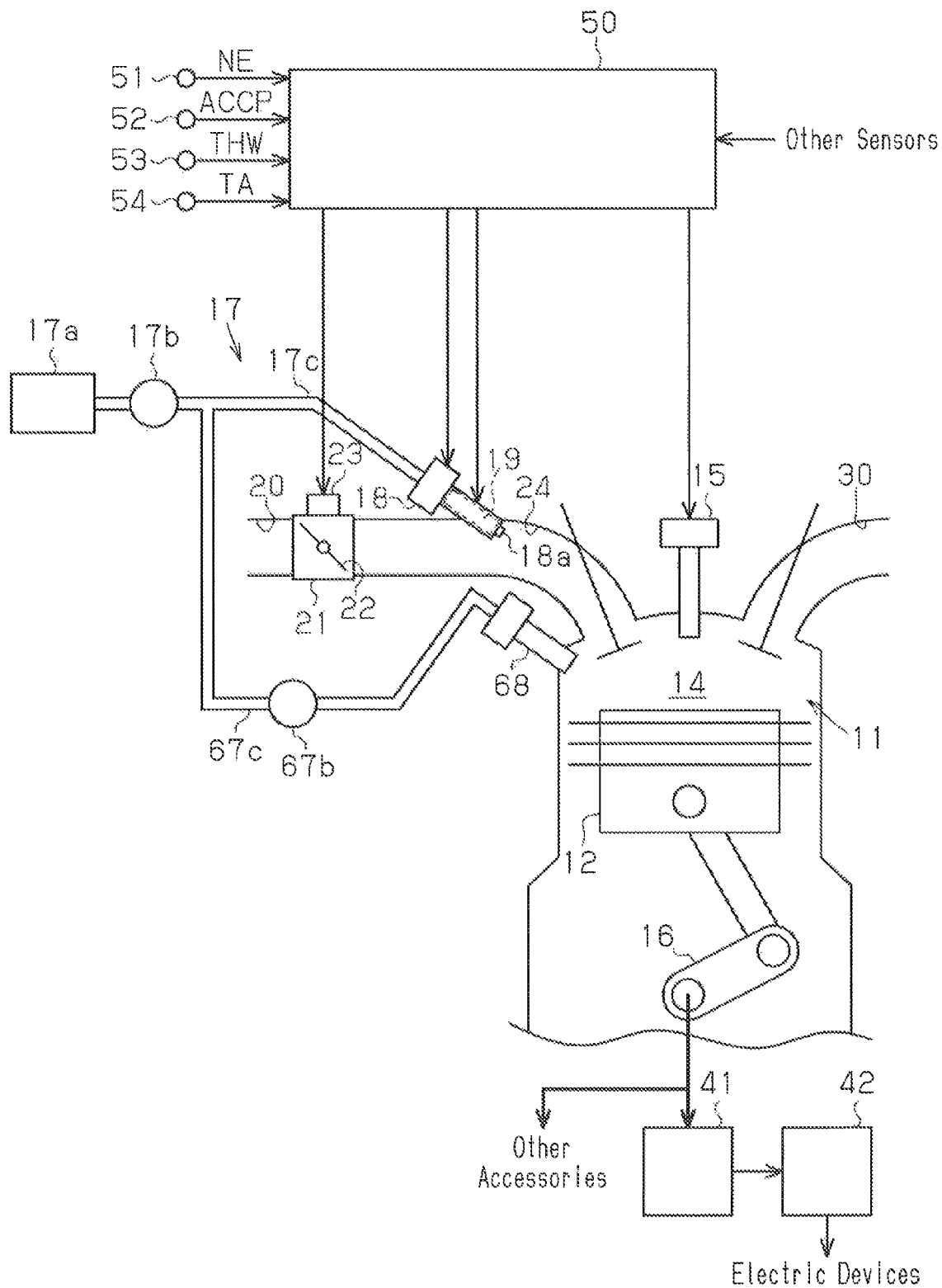
FIG. 9 is a schematic diagram of a controller for a gasoline engine according to a third embodiment of the present invention illustrating the engine and an electronic controller that controls the engine.

FIG. 9 schematically shows an engine of the present embodiment and the electronic controller 50 that controls the engine. Further, FIG. 9 shows the cross-sectional structure of a single cylinder 11.

As shown in FIG. 9, the engine of the present embodiment basically has the same structure as the engines of the first and second embodiment. However, in addition to the fuel injection valve (hereafter referred to as the port type fuel injection valve 18) that injects fuel into the intake port 24, the engine of the present embodiment includes a fuel injection valve (hereafter referred to as the direct injection type fuel injection valve 68) that injects fuel into the cylinder 11. Further, the electric heater 19 is incorporated in only the port type fuel injection valve 18 and not incorporated in the direct injection type fuel injection valve 68.

Specifically, a second supply passage 67c is branched from a portion of the supply passage 17c located at the downstream side of the fuel pump 17b, and the second supply passage 67c is connected to the direct injection type fuel injection valve 68. Further, a high-pressure fuel pump 67b is located in the second supply passage 67c to further pressurize the fuel that has been pressurized by the fuel pump 17b.

The electronic controller 50 sets the fuel injection amount Q based on an engine operation condition, such as the intake air amount GA or the air-fuel ratio AF of the exhaust. Further, an injection distribution ratio (port ratio Rp, direct injection ratio Rd (=1−Rp) of the fuel injected from the fuel injection valves 18 and 68 is set based on an engine operation condition such as the present engine speed NE or the engine load KL, and the injection distribution ratio is multiplied by the fuel injection amount Q to calculate the amount of the fuel injected from the fuel injection valves 18 and 68.

Figure 10:
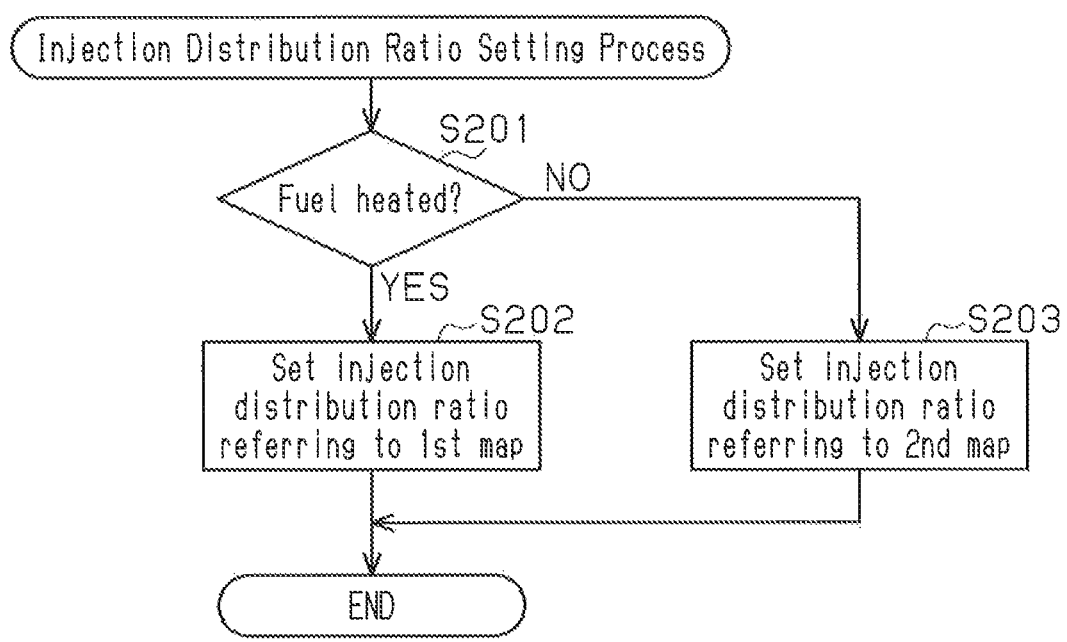
FIG. 10 is a flowchart illustrating the procedures for executing an injection distribution ratio setting process in the third embodiment.

With reference to FIG. 10, an injection distribution ratio setting process of the present embodiment performed by the electronic controller 50 will now be described.

As shown in FIG. 10, in the series of processes, the electronic controller 50 first determines whether or not the fuel in the port type fuel injection valve 18 is heated (step S201). When the fuel is heated (step S201: "YES"), the electronic controller 50 proceeds to step S202, sets the injection distribution ratio with reference to a first map, and temporarily terminates the series of processes.

When the fuel is not heated (step S201: "NO"), the electronic controller 50 proceeds to step S203, sets the injection distribution ratio with reference to a second map, and temporarily terminates the series of processes.

Each of the maps is a two-dimensional map that specifies the injection distribution ratio with the engine speed NE and the engine load KL. When the engine speed NE is the same and the engine load KL is the same, the injection distribution ratio Rp of the port type fuel injection valve 18 is greater in the first map than in the second map. That is, the ratio of the fuel injected from the port type fuel injection valve 18 is greater when the fuel injected from the port type fuel injection valve 18 is heated by the electric heater 19 than when not heated.

The operation of the present embodiment will now be described.

The ratio of the fuel injected from the port type fuel injection valve 18, that is, the fuel heated by the electric heater 19 to enhance atomization, is increased. Further, the ratio of the fuel injected from the direct injection type fuel injection valve 68, that is, the fuel that is not heated and thus difficult to enhance atomization, is decreased. This increases the amount of the fuel injected from the port type fuel injection valve 18 and enhances atomization of the fuel. Thus, even though the amount of the fuel injected from the port type fuel injection valve 18 is increased, the atomization of fuel is enhanced. This decreases the amount of the fuel that collects on the wall in the intake port 24.

The fuel injected from the direct injection type fuel injection valve 68 is not heated making it difficult to enhance atomization of the fuel. However, the injected amount of the fuel is decreased. Thus, the amount of fuel that collected on the wall in the cylinder 11 is decreased.

The controller for the gasoline engine in the present embodiment has the following advantage.

(6) The engine includes the port type fuel injection valve 18, which injects fuel into the intake port 24, and the direct injection type fuel injection valve 68, which directly injects fuel into the cylinder 11. Further, the electric heater 19 heats only the fuel that is injected from the port type fuel injection valve 18. The ratio of the fuel injected from the fuel injection valve 18 is increased when the fuel injected from the port type fuel injection valve 18 is increased by the electric heater 19 than when not heated. Such a configuration allows for a decrease in the total amount of fuel that collects on the wall in the intake port 24 and on the wall in the cylinder 11. Thus, the particle number (PN) of the PM suspended in the exhaust may be properly reduced.

The controller for a gasoline engine according to the present invention is not limited to the configuration exemplified in the above embodiment and may be modified, for example, in the forms described below.

The mode for determining whether or not the engine is cold is not limited to the exemplifications in the above embodiments and may be determined based on the temperature of the engine lubrication oil or the intake temperature.

In each of the above embodiments, the fuel in the fuel injection valve 18 is determined as having been heated when the electric heater 19 is energized (for example, refer to the process of step S11 in FIG. 3). Instead, a sensor may be used to detect the temperature in the fuel injection valve and determine whether or not the fuel in the fuel injection valve has been heated from the detection result of the sensor. This allows for further accurate determination of whether or not the fuel in the fuel injection valve has been heated.

In the first and second embodiments, the present invention is applied to an engine including only the port type fuel injection valve 18. Instead, the present invention may be applied to an engine including only a direction fuel injection valve. In this case, the energizing control of the electric heater 19, the idle speed control, and the fuel cut recovery control exemplified in the first and second embodiments may also be performed.

In the third embodiment, the engine that includes both of the port type fuel injection valve 18 and the direct injection type fuel injection valve 68 is exemplified in a structure that incorporates the electric heater 19 in only the port type fuel injection valve 18. However, the present invention is not limited in such a manner, and an electric heater may be incorporated in only the direction fuel injection valve. Further, an electric heater may be incorporated in both of the port type fuel injection valve and the direct injection type fuel injection valve.

In the first and second embodiments, it is desirable that the heating with the electric heater 19 and the fuel injection amount Q of the fuel injection valve 18 be controlled so that the fuel consumption amount S of the gasoline engine decreases when the fuel injected from the fuel injection valve 18 is heated by the electric heater 19 as compared to when the fuel is not heated. However, the present invention may also be applied when the fuel consumption amount S of the gasoline engine increases when the fuel injected from the fuel injection valve 18 is heated by the electric heater 19 as compared to when the fuel is not heated.

Each of the above embodiments is exemplified in a structure that incorporates the electric heater 19 in the fuel injection valve 18. However, the heating device in the present invention is not limited in such a manner. For example, a pipe that supplies the fuel injection valve with fuel may be heated. It is only required that an electric heating device heat the fuel in a portion of a fuel supply line located at the upstream side of an injection hole of a fuel injection valve.

The present invention may be embodied in a controller for a gasoline engine used in a hybrid vehicle that includes an electric motor in addition to the gasoline engine as the drive source of the vehicle. In this case, the present invention may be applied when initiating fuel injection to start the engine during an EV travelling mode. That is, if the engine is cold and fuel injection from the fuel injection valve is initiated, when heating the fuel injected from the fuel injection valve with the heating device, the amount of fuel injected from the fuel injection valve may be less than the non-heated condition fuel injection amount as long as the other engine operation conditions are the same.

DESCRIPTION OF REFERENCE SYMBOLS

11: cylinder
12: piston
14: combustion chamber
15: spark plug
16: crankshaft
17: fuel supply line
17a: fuel tank
17b: fuel pump
17c: supply passage
18: fuel injection valve
18a: injection hole
19: electric heater
20: intake passage
21: throttle body
22: throttle valve
23: throttle motor
24: intake port
30: exhaust passage
41: alternator
42: battery
50: electronic controller
51: engine speed sensor
52: accelerator depression amount sensor
53: coolant sensor
54: throttle sensor
67b: high-pressure fuel pump
67c: second supply passage
68: fuel injection valve

The invention claimed is:

1. A gasoline engine controller that controls a gasoline engine including an electric heating device that heats fuel in a portion of a fuel supply line located at an upstream side of an injection hole of a fuel injection valve, wherein
the controller heats the fuel with the heating device when the engine is cold, and
when the engine is cold and idling, the amount of fuel injected from the fuel injection valve is controlled so that the engine speed when the fuel injected from the fuel injection valve is heated by the heating device is less than the engine speed when the fuel injected from the fuel injection valve is not heated by the heating device.

2. The gasoline engine controller according to claim 1, wherein
the heating device is activated by power supplied from a battery,
the battery is configured to be charged by power generated by an engine-driven power generator, and
when the engine is cold and idling, the heating performed by the heating device and the amount of fuel injected from the fuel injection valve are controlled so that the fuel consumption amount of the gasoline engine is less when the fuel injected from the fuel injection valve is heated by the heating device as compared to when the fuel is not heated.

3. The gasoline engine controller according to claim 1, when the engine is cold and the fuel injection valve starts or resumes fuel injection, the amount of fuel injected from the fuel injection valve is controlled so that the fuel injection amount when the fuel injected from the fuel injection valve is heated by the heating device is less than the fuel injection amount when the fuel injected from the fuel injection valve is not heated by the heating device under the condition that other engine operation conditions are the same.

4. The gasoline engine controller according to claim 3, wherein
the heating device is activated by power supplied from a battery,
the battery is configured to be charged by power generated by an engine-driven power generator, and
when the engine is cold and the fuel injection valve starts or resumes fuel injection, the heating performed by the heating device and the amount of fuel injected from the fuel injection valve are controlled so that the fuel consumption amount of the gasoline engine is less when the fuel injected from the fuel injection valve is heated by the heating device as compared to when the fuel is not heated.

5. The gasoline engine controller according to claim 1, wherein
the gasoline engine includes both of a port type fuel injection valve, which injects fuel into an intake port, and a direct injection type fuel injection valve, which directly injects fuel into a cylinder,
the heating device is configured to heat the fuel injected from one of the fuel injection valves among the port type fuel injection valve and the direct injection type fuel injection valve, and
a ratio of the fuel injected from the one of the fuel injection valves is greater when the fuel injected from the one of the fuel injection valves is heated by the heating device than when the fuel is not heated.

6. The gasoline engine controller according to claim 1, wherein a determination is made that the gasoline engine is cold when temperature of the engine is less than or equal to a predetermined temperature.

* * * * *